(12) United States Patent
Ogawa et al.

(10) Patent No.: US 10,858,779 B2
(45) Date of Patent: Dec. 8, 2020

(54) SOUND-ABSORBING MEMBRANE, SOUND ABSORBING MATERIAL, AND METHODS OF MANUFACTURE THEREOF

(71) Applicant: NAGOYA OILCHEMICAL CO., LTD., Aichi (JP)

(72) Inventors: Masanori Ogawa, Aichi (JP); Makoto Fujii, Aichi (JP)

(73) Assignee: NAGOYA OILCHEMICAL CO., LTD., Aichi (JP)

( * ) Notice: Subject to any disclaimer, the term of this patent is extended or adjusted under 35 U.S.C. 154(b) by 56 days.

(21) Appl. No.: 16/072,368

(22) PCT Filed: May 30, 2017

(86) PCT No.: PCT/JP2017/020125
§ 371 (c)(1),
(2) Date: Jul. 24, 2018

(87) PCT Pub. No.: WO2018/066169
PCT Pub. Date: Apr. 12, 2018

(65) Prior Publication Data
US 2019/0062991 A1    Feb. 28, 2019

(30) Foreign Application Priority Data

Oct. 3, 2016    (JP) ................. 2016-195801

(51) Int. Cl.
*D06N 3/04* (2006.01)
*D06N 3/00* (2006.01)
(Continued)

(52) U.S. Cl.
CPC ............. *D06N 3/042* (2013.01); *B32B 5/022* (2013.01); *B32B 5/24* (2013.01); *B32B 5/26* (2013.01);
(Continued)

(58) Field of Classification Search
CPC ........ D06N 3/042; D06N 3/0065; D06N 3/12; D06N 3/0036; D06N 3/0088;
(Continued)

(56) References Cited

U.S. PATENT DOCUMENTS 6,454,048 B1 * 9/2002 Alts .................... B32B 5/02
181/286
7,137,477 B2 * 11/2006 Keller .................. G10K 11/162
181/286

(Continued)

FOREIGN PATENT DOCUMENTS

CN      1668433       9/2005
CN      104136694    11/2014
(Continued)

OTHER PUBLICATIONS

International Search Report (and English translation thereof) dated Aug. 8, 2017 in connection with International application No. PCT/JP2017/020125.

*Primary Examiner* — Michael N Orlando
*Assistant Examiner* — Abhishek A Patwardhan
(74) *Attorney, Agent, or Firm* — Cooper & Dunham LLP (57) ABSTRACT

Provided are a sound-absorbing membrane, a sound-absorbing material, and methods of manufacture therefor that can provide suitable sound absorbing performance, suppressed deterioration in appearance quality, and easy production. A sound-absorbing membrane 10 includes: a base sheet 11 made of a nonwoven fabric having a airflow resistance of 0.01 to 0.1 kPa·s/m; and a resin film 12 covering one surface of the base sheet, the resin film 12 made of a thermosetting resin in a semi-cured state. Fillers 13 made of powder having an average particle diameter of 1 to 100 μm are dispersed in the resin film 12. The sound-absorbing membrane 10 has a whole airflow resistance of 0.2 to 5.0 kPa·s/m. A sound-absorbing material 20 includes a sound absorbing base sheet (Continued)

21 made of a porous material, and the sound-absorbing membrane 10 laminated on one surface or both surfaces of the sound absorbing base sheet 21 such that the resin film 12 faces the sound absorbing base sheet 21, the sound-absorbing material 20 has a predetermined shape.

12 Claims, 1 Drawing Sheet (51) Int. Cl.
*B32B 5/02* (2006.01)
*B32B 5/26* (2006.01)
*B32B 37/06* (2006.01)
*B32B 37/10* (2006.01)
*B32B 37/18* (2006.01)
*G10K 11/168* (2006.01)
*B32B 5/24* (2006.01)
*B32B 38/00* (2006.01)
*D06N 3/12* (2006.01)

(52) U.S. Cl.
CPC .............. *B32B 37/06* (2013.01); *B32B 37/10* (2013.01); *B32B 37/182* (2013.01); *B32B 38/164* (2013.01); *D06N 3/0011* (2013.01); *D06N 3/0036* (2013.01); *D06N 3/0063* (2013.01); *D06N 3/0065* (2013.01); *D06N 3/0088* (2013.01); *D06N 3/12* (2013.01); *G10K 11/168* (2013.01); *B32B 2038/0076* (2013.01); *B32B 2250/02* (2013.01); *B32B 2250/20* (2013.01); *B32B 2255/02* (2013.01); *B32B 2255/10* (2013.01); *B32B 2255/26* (2013.01); *B32B 2262/0276* (2013.01); *B32B 2262/101* (2013.01); *B32B 2264/107* (2013.01); *B32B 2305/20* (2013.01); *B32B 2305/72* (2013.01); *B32B 2305/74* (2013.01); *B32B 2307/102* (2013.01); *B32B 2315/02* (2013.01); *B32B 2315/085* (2013.01); *B32B 2333/08* (2013.01); *B32B 2367/00* (2013.01); *D06N 2205/08* (2013.01); *D06N 2205/16* (2013.01); *D06N 2205/22* (2013.01); *D06N 2209/025* (2013.01); *D06N 2209/123* (2013.01)

(58) Field of Classification Search
CPC .............. D06N 3/0063; D06N 3/0011; D06N 2205/22; D06N 2205/08; D06N 2205/16; D06N 2209/025; D06N 2209/123; B32B 5/24; B32B 38/164; B32B 5/022; B32B 5/26; B32B 37/06; B32B 37/10; B32B 37/182; B32B 2038/0076; B32B 2333/08; B32B 2250/02; B32B 2250/20; B32B 2255/02; B32B 2255/10; B32B 2255/26; B32B 2262/0276; B32B 2262/101; B32B 2264/107; B32B 2305/20; B32B 2305/72; B32B 2305/74; B32B 2307/102; B32B 2315/085; B32B 2315/02; B32B 2367/00; G10K 11/168
See application file for complete search history.

(56) References Cited

U.S. PATENT DOCUMENTS

| | | | |
|---|---|---|---|
| 7,419,188 B2 * | 9/2008 | Nicolai | B32B 27/12 |
| | | | 280/847 |
| 8,393,438 B2 * | 3/2013 | Ogawa | B32B 5/26 |
| | | | 181/286 |
| 8,403,108 B2 * | 3/2013 | Bliton | B32B 29/02 |
| | | | 181/294 |
| 9,315,930 B2 * | 4/2016 | Coates | B32B 5/022 |
| 9,546,439 B2 * | 1/2017 | Coates | B29C 70/545 |
| 2010/0143695 A1 * | 6/2010 | Ogawa | B29C 51/004 |
| | | | 428/306.6 |
| 2014/0230336 A1 * | 8/2014 | Flener | B60J 5/0412 |
| | | | 49/472 |
| 2016/0035548 A1 | 2/2016 | Brown et al. | |
| 2017/0088750 A1 * | 3/2017 | Bush | B32B 5/22 |
| 2018/0047380 A1 * | 2/2018 | Bush | B32B 27/12 |

FOREIGN PATENT DOCUMENTS

| | | | |
|---|---|---|---|
| JP | 2001-123012 A | | 5/2001 |
| JP | 2013-119169 A | | 6/2013 |
| JP | 2013119169 | | 6/2013 |
| JP | 2013-164541 A | | 8/2013 |
| JP | 2013164541 | | 8/2013 |
| JP | 2013164541 A | * | 8/2013 |
| JP | 2014-519585 A | | 8/2014 |
| JP | 2015-509869 A | | 4/2015 |
| JP | 2016-155370 A | | 9/2016 |
| JP | 2016155370 | | 9/2016 |
| WO | 2013108170 | | 7/2013 |

* cited by examiner

SOUND-ABSORBING MEMBRANE, SOUND ABSORBING MATERIAL, AND METHODS OF MANUFACTURE THEREOF

REFERENCE TO RELATED APPLICATIONS

This Application is a § 371 National Stage filing of PCT/JP17/020125, filed May 30, 2017.

TECHNICAL FIELD

The present invention relates to a sound-absorbing membrane and a sound-absorbing material used for interior and exterior materials for a vehicle such as an automobile, a building such as a residential building, an aircraft, and a marine vessel and the like, and methods of manufacture therefor.

BACKGROUND ART

Generally, for example, a porous material such as glass wool, rock wool or felt is used in order to suppress noise as a material for interior and exterior materials for a vehicle such as an automobile, a building such as a residential building, an aircraft, and a marine vessel and the like (hereinafter also referred to as "automobile and the like" for short). However, the porous material such as glass wool, rock wool or felt exhibits excellent sound absorbing characteristics for sound in a specific high frequency range, but mostly not for sound other than the sound in a specific high frequency range such as sound in a low frequency range. To improve the sound absorbing performance, the porous material is to be increased in its thickness. This disadvantageously makes it difficult to secure a space for mounting the porous material on an automobile and the like, and causes an increased weight.

Therefore, in sound-absorbing materials disclosed in Patent Literatures 1 and 2, a powder layer made of powder is provided on a surface of a porous material, and vibration of the powder during sound incidence is utilized, and thereby the sound absorbing performance is improved without increasing the thickness and weight of the porous material. The powder layer is formed by applying a binder resin containing powder to a surface of the porous material and curing the binder resin.

Meanwhile, the production of appearance exerting the texture of fibers is required for, particularly, an interior material for a recent automobile and the like. In such a case, the skin material made of fibers is laminated on a surface of the porous material as described above, thereby improving appearance quality.

As the skin material as described above, for example, Patent Literature 3 discloses a skin material containing a powdery hot melt adhesive applied to one surface (back surface) of a nonwoven fabric impregnated with a synthetic resin. Patent Literature 4 discloses a skin material obtained by impregnating a fiber sheet having a water repellent agent coating layer formed on its surface with an aqueous synthetic resin liquid from a back surface of the fiber sheet.

Patent Literature 5 discloses a skin material obtained by impregnating a nonwoven fabric with a synthetic resin in a method of manufacturing an interior material in which a skin material and a base sheet (a porous material) are overlapped with each other, and are hot pressed together to be formed into a predetermined shape.

Furthermore, there is proposed a skin material not only providing improved appearance quality as described above but also having sound absorbing performance. For example, Patent Literature 6 discloses that the sound absorbing performance is obtained by laminating, on one surface or both surfaces of a fiber sheet, a stretchable paper material having a large number of unevennesses formed on its surface and having a predetermined airflow resistance.

CITATIONS LIST

Patent Literatures

Patent Literature 1: Japanese Unexamined Patent Application Publication No. H11-133980
Patent Literature 2: Japanese Unexamined Patent Application Publication No. H11-219187
Patent Literature 3: Japanese Unexamined Patent Application Publication No. 2000-319615
Patent Literature 4: Japanese Unexamined Patent Application Publication No. 2003-301384
Patent Literature 5: Japanese Unexamined Patent Application Publication No. 2008-087430
Patent Literature 6: Japanese Unexamined Patent Application Publication No. 2009-214871

SUMMARY OF INVENTION

Technical Problems

In general, interior and exterior materials for an automobile and the like are obtained by pasting a skin material on a surface of a porous material, and thereafter heating the pasted product during hot press forming for forming the product into a predetermined shape. However, when the porous material or the skin material is coated or impregnated with a synthetic resin (for example, Patent Literatures 1 to 3), the synthetic resin is often squeezed out from the porous material or the skin material by pressurization during the hot press forming, and oozes out on a surface of the skin material. A portion where the synthetic resin has oozed out on a surface of the skin material has texture peculiar to the synthetic resin such as gloss, and thereby texture provided by the fibers is lost, which causes deterioration in appearance quality.

In a recent automobile and the like, particularly in a hybrid car and an electric automobile, engine sound is decreased, which disadvantageously causes sound in a frequency range that has not been recognized as noise as far as, and road noise and wind noise entering from an outside of the automobile to be recognized as noise. The sound absorbing performance is required to be further improved in order to cope with the noise. Patent Literatures 1 and 2 mainly exhibit excellent sound absorbing characteristics for sound in a high frequency range (2000 Hz or more), but not sufficiently for sound in a low frequency range, and thereby a recent automobile and the like cannot be said to have sufficient sound absorbing performance for sound now recognized as noise. In particular, when the skin material is pasted onto the porous material in order to improve appearance quality, there is a high probability that sound absorbing characteristics are changed by the skin material, which makes it also necessary to consider such a change in the sound absorbing characteristics. Patent Literatures 3, 4, and 5 have attempted to solve the deterioration in appearance quality as described above. However, improvement in sound absorption performance is not attempted. Patent Literature 6 attempts to improve the appearance quality and the sound absorbing performance. However, Patent Literature 6 disadvantageously involves troublesome work for pasting the stretchable paper material onto the fiber sheet, and has poor formability because the stretchable paper material tends to tear. The present invention has been devised by focusing on such problems in the conventional. It is an object of the present invention to provide a sound-absorbing membrane, a sound-absorbing material, and methods of manufacture therefor that can provide suitable sound absorbing performance, suppressed deterioration in appearance quality, and easy production.

Solutions to Problems

As means for solving the conventional problems, a sound-absorbing membrane according to a first aspect includes: a base sheet made of a nonwoven fabric having a airflow resistance of 0.01 to 0.1 kPa·s/m; and a resin film covering one surface of the base sheet, the resin film made of a thermosetting resin in a semi-cured state, wherein: fillers made of powder having an average particle diameter of 1 to 100 μm are dispersed in the resin film; and the sound-absorbing membrane has a whole airflow resistance of 0.2 to 5.0 kPa·s/m.

A second aspect of the present invention provides the sound-absorbing membrane according to the first aspect, wherein the nonwoven fabric used for the base sheet has a mass per unit area of 10 g/m² to 120 g/m² and a thickness of 0.1 to 2.0 mm.

A third aspect of the present invention provides the sound-absorbing membrane according to the first or second aspect, wherein the thermosetting resin used for the resin film is a resorcinol resin or an ester bond-forming curable thermosetting acrylic resin. A fourth aspect of the present invention provides the sound-absorbing membrane according to any one of the first to third aspects, wherein, in the resin film, a mixing ratio of the fillers/the thermosetting resin is from 55/45 to 70/30 in a solid content ratio.

A fifth aspect of the present invention provides a sound-absorbing material including: a sound absorbing base sheet made of a porous material; and the sound-absorbing membrane according to any one of the first to fourth aspects laminated on one surface or both surfaces of the sound absorbing base sheet such that the resin film faces the sound absorbing base sheet, the sound-absorbing material has a predetermined shape.

A sixth aspect of the present invention provides a method of manufacturing the sound-absorbing membrane according to any one of the first to fourth aspects, the method including the steps of: applying a coating liquid obtained by dispersing the fillers in a liquid of the thermosetting resin in an uncured state onto the base sheet made of the nonwoven fabric having the airflow resistance of 0.01 to 0.1 kPa·s/m such that an applied amount of the coating liquid is within a range of 10 g/m² to 50 g/m² in terms of a solid content; and heating and drying the base sheet onto which the coating liquid is applied, at a predetermined temperature so as to bring the thermosetting resin into a semi-cured state, to form the resin film.

A seventh aspect of the present invention provides the method according to the sixth aspect, wherein: the thermosetting resin is a resorcinol resin or an ester bond-forming curable thermosetting acrylic resin; and the base sheet is heated and dried at a temperature of 120° C. or more and 160° C. or less.

An eighth aspect of the present invention provides a method of manufacturing a sound-absorbing material, the method including the steps of: laminating the sound-absorbing membrane according to any one of the first to fourth aspects on one surface or both surfaces of a sound absorbing base sheet made of a porous material such that the resin film faces the sound absorbing base sheet, to obtain a sound absorbing original fabric formed into a sheet shape and including the sound-absorbing membrane and the sound absorbing base sheet; and thereafter subjecting the sound absorbing original fabric to hot press forming at a temperature of 180° C. or more, to bring the thermosetting resin of the resin film into a cured state while forming the sound absorbing original fabric into a predetermined shape.

Advantageous Effects of Invention

[Operation]

The sound-absorbing membrane of the present invention includes the base sheet made of the nonwoven fabric, and the resin film covering one surface of the base sheet, the resin film made of the thermosetting resin. For example, the sound-absorbing membrane is pasted onto a surface of the porous material, and the base sheet made of the nonwoven fabric exerts the texture of the fibers in order to provide the appearance. Furthermore, since the sound-absorbing membrane has a whole airflow resistance of 0.2 to 5.0 kPa·s/m, the sound-absorbing membrane has suitable sound absorbing performance, and is useful as a sound-absorbing material. Here, the airflow resistance (Pa·s/m) of the present invention refers to a value measured by an air permeability tester (product name: KES-F8-AP1, manufactured by Kato Tech Co., Ltd., a steady flow differential pressure measurement method).

In the sound-absorbing membrane, by using a nonwoven fabric having a airflow resistance of 0.01 to 0.1 kPa·s/m for the nonwoven fabric of the base sheet, the whole airflow resistance of the whole sound-absorbing membrane is not impaired. Furthermore, when the airflow resistance of the nonwoven fabric is set to be within the above range, the thermosetting resin of the resin film does not penetrate into the nonwoven fabric more than necessary, which provides suppressed deterioration in appearance quality.

In the sound-absorbing membrane, the thermosetting resin of the resin film is brought into the semi-cured state, and thereby the thermosetting resin suitably maintains deformability and extensibility allowing plastic working, namely, formability. The thermosetting resin is not in an uncured state but in the semi-cured state, and thereby the penetration of the thermosetting resin into the nonwoven fabric of the base sheet is suppressed. Furthermore, when the sound-absorbing membrane is laminated on a surface of the porous material and the laminated product is subjected to hot press forming, the thermosetting resin used for the resin film reacts during heating to be brought into the cured state. That is, unlike a thermosetting resin used for conventional skin materials, the thermosetting resin of the present invention is not softened by heating during hot press forming, does not penetrate into the nonwoven fabric of the base sheet by pressurization, and does not ooze out on a surface of the base sheet, which can provide suppressed deterioration in appearance quality.

Here, the semi-cured state means a state where the reaction of the thermosetting resin is in an intermediate stage, and the thermosetting resin is soluble in a certain type of solvent, is softenable by heating, but is not completely dissolved or melted, namely, a B-stage (defined in JIS K 6900-1994 and JIS K 6800-2006). The cured state means a state where the reaction of the thermosetting resin is in a final stage, and the thermosetting resin is practically insoluble and infusible, namely, a C-stage (defined in JIS K 6900-1994 and JIS K 6800-2006). Furthermore, the uncured state means a state where the reaction of the thermosetting resin is in an initial stage, and the thermosetting resin is soluble in a certain type of solvent, and melted by heating, namely, an A-state (defined in JIS K 6900-1994 and JIS K 6800-2006). In the sound-absorbing membrane, fillers made of powder having an average particle diameter of 1 to 100 µm are dispersed in the resin film. The thermosetting resin is applied in a liquid state onto the nonwoven fabric of the base sheet, and a thermosetting resin liquid adheres to a surface of the fillers to generate surface tension. This surface tension suppresses the penetration of the thermosetting resin liquid into the base sheet more than necessary, is less likely to cause the thermosetting resin liquid to ooze out on a surface of the base sheet, and provides suppressed deterioration in appearance quality. In addition, since the surface tension causes the thermosetting resin liquid adhering onto the surface of the fillers to spread along the surface of the fillers, a gap formed between the fillers is less likely to be filled with the thermosetting resin, and thereby the whole airflow resistance of the whole sound-absorbing membrane can be kept within the above range. When the sound-absorbing membrane is laminated on the surface of the porous material, and the laminated product is subjected to hot press forming, conventionally, the resin is directly pressurized to be pressed into the base sheet and to be squeezed out. Contrastingly, the present invention suppresses the pressurization on the thermosetting resin in the semi-cured state when the fillers are pressurized, and the pressing of the thermosetting resin into the base sheet and the squeezing-out of the thermosetting resin from the base sheet, and thereby deterioration in appearance quality can be suppressed (a first aspect).

Using the nonwoven fabric of the base sheet having a mass per unit area of 10 g/m$^2$ to 120 g/m$^2$ and a thickness of 0.1 to 2.0 mm can suitably suppress the penetration of the thermosetting resin applied in a liquid state and the oozing-out of the thermosetting resin to a surface of the base sheet caused by the penetration (a second aspect).

For the thermosetting resin of the resin film, the resorcinol resin or the ester bond-forming curable thermosetting acrylic resin is used, and thereby the thermosetting resin has a longer pot life in the semi-cured state (a longer period allowing processing work, a longer usable time) and stable performance, which makes it possible to easily treat the sound-absorbing membrane (a third aspect).

In the resin film, a mixing ratio of the fillers/the thermosetting resin is from 55/45 to 70/30 in a solid content ratio, which makes it possible to exhibit better sound absorbing performance while suitably keeping appearance quality (a fourth aspect).

In the sound-absorbing material of the present invention, the sound-absorbing membrane is laminated on one surface or both surfaces of the sound absorbing base sheet made of the porous material such that the resin film faces the sound absorbing base sheet, and the sound-absorbing material is formed into a predetermined shape. Using the sound-absorbing membrane can provide suitable sound absorbing performance and suitable appearance quality (a fifth aspect).

According to the method of manufacturing the sound-absorbing membrane of the present invention, the sound-absorbing membrane can be easily produced by applying the coating liquid obtained by dispersing the fillers in the liquid of the thermosetting resin in the uncured state onto the base sheet made of the nonwoven fabric having a airflow resistance of 0.01 to 0.1 kPa·s/m such that an applied amount of the coating liquid is within a range of 10 g/m$^2$ to 50 g/m$^2$ in terms of solid content; and heating and drying the base sheet to which the coating liquid is applied at a predetermined temperature so as to bring the thermosetting resin into the semi-cured state (the B-stage) to form the resin film. When the applied amount (in terms of solid content) of the coating liquid is less than 10 g/m$^2$, the resin layer is not formed on the whole surface of the base sheet. When the applied amount exceeds 50 g/m$^2$, the applied coating liquid penetrates into the base sheet by its own weight, which has a high probability of causing deterioration in appearance quality. Furthermore, in the above conventional Patent Literatures 1 and 2, the applied amount is within a range of more than about 200 g/m$^2$ to about 1000 g/m$^2$ in terms of solid content. This can easily cause an increased weight, which makes it difficult to reduce weight for achieving a lower fuel consumption strongly required for recent automobiles. However, in the sound-absorbing membrane obtained by the manufacturing method of the present invention, the applied amount of the coating liquid is within the range of 10 g/m$^2$ to 50 g/m$^2$ in terms of solid content, which easily reduces weight (a sixth aspect).

When the thermosetting resin is the resorcinol resin or the ester bond-forming curable thermosetting acrylic resin, and the base sheet is heated and dried at a temperature of 120° C. or more and 160° C. or less, the thermosetting resin can be suitably brought into the semi-cured state (the B-stage). When the temperature at which the base sheet is heated and dried is less than 120° C., there is a high probability that the thermosetting resin is not in the semi-cured state (the B-stage) but is in the uncured state (the A-stage). When the temperature exceeds 160° C., there is a high probability that the thermosetting resin does not stay in the semi-cured state (the B-stage) but is in the cured state (the C-stage) (a seventh aspect).

According to the method of manufacturing the sound-absorbing material of the present invention, the sound-absorbing material can be easily produced by laminating the sound-absorbing membrane on one surface or both surfaces of the sound absorbing base sheet made of the porous material such that the resin film faces the sound absorbing base sheet, and subjecting the laminated product to hot press forming at a temperature of 180° C. or more to form the laminated product into a predetermined shape. The resin film of the sound-absorbing membrane is made of the thermosetting resin, but it is in the semi-cured state (the B-stage), and thereby the resin film maintains formability while keeping a film-like form. This makes it possible to form the resin film into a predetermined shape. After the hot press forming, the resin film is brought into the cured state (the C-stage), and thereby the predetermined shape can be suitably kept. Since the thermosetting resin is cured during hot press forming without being softened, the softened resin is not squeezed out on a surface of the base sheet by pressurization, and thereby deterioration in appearance quality can be suitably suppressed (an eighth aspect).

[Effects]

According to the sound-absorbing membrane of the present invention, the resin film is made of the thermosetting resin in the semi-cured state, and the fillers are dispersed in the resin film, which can provide suppressed deterioration in appearance quality while providing suitable sound absorbing performance.

According to the sound-absorbing material of the present invention, the fillers dispersed in the resin film of the sound-absorbing membrane receive a pressure during pressing, which can provide suppressed deterioration in appearance quality while providing suitable sound absorbing performance.

According to the method of manufacturing the sound-absorbing membrane of the present invention, by applying the thermosetting resin liquid to one surface of the base sheet and bringing the resin film into the semi-cured state to form the resin film, the sound-absorbing membrane can be easily produced.

According to the method of manufacturing the sound-absorbing material of the present invention, the sound-absorbing material can be easily produced by laminating the sound-absorbing membrane on the sound absorbing base sheet made of the porous material and forming the laminated product into a predetermined shape.

DESCRIPTION OF EMBODIMENTS

Figure 1:
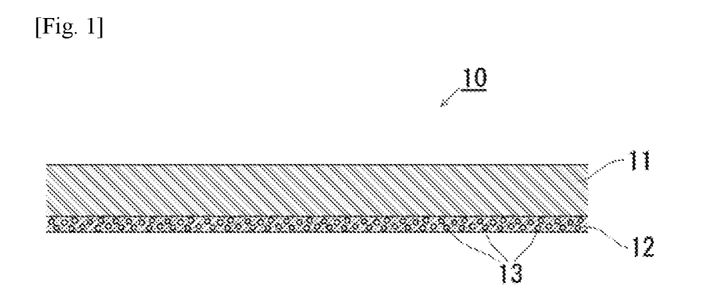
FIG. 1 is a cross-sectional view showing a sound-absorbing membrane of an embodiment.

Hereinafter, an embodiment embodying the present invention will be described with reference to the drawings. As shown in FIG. 1, a sound-absorbing membrane 10 of the present embodiment includes a base sheet 11 and a resin film 12 covering a back surface that is one surface of the base sheet 11. In the resin film 12, fillers 13 are dispersed.

As a material of the base sheet 11, a nonwoven fabric made of fibers is used. Examples of the fibers include synthetic fibers such as polyester fibers, polyethylene fibers, polypropylene fibers, polyamide fibers, acrylic fibers, urethane fibers, polyvinyl chloride fibers, polyvinylidene chloride fibers, and acetate fibers; biodegradable fibers (polylactic acid fibers) made of starch extract from plants such as corn and sugarcane; natural fibers such as pulp, cotton, palm fibers, hemp fibers, bamboo fibers, and kenaf fibers; inorganic fibers such as glass fibers, carbon fibers, ceramic fibers, and asbestos fibers; and regenerated fibers obtained by defibrating scraps of fiber products made of the above fibers. As the base sheet 11, one, or two or more of the exemplified fibers are used.

For example, when heat resistant synthetic fibers having a melting point of 250° C. or more such as aramid fibers (such as poly-(m-phenylene isophthalamide) fibers and poly-(p-phenylene terephthalamide) fibers), polyarylate fibers, polyetheretherketone fibers, and polyphenylene sulfide fibers are used in mixtures, the base sheet 11 has an extremely higher heat resistance. Among them, the carbon fibers are useful inorganic fibers from the viewpoint that the carbon fibers can be incinerated and scarcely scattered in small pieces. The aramid fibers are useful flame-retardant synthetic fibers from the viewpoint that the aramid fibers are easily available at relatively low price.

Low melting point thermoplastic fibers having a melting point of 180° C. or less may be used for all or a part of the fibers. Examples of the low melting point thermoplastic fibers include polyolefin-based fibers having a melting point of 180° C. or less and made of polyethylene, polypropylene, an ethylene-vinyl acetate copolymer, or an ethylene-ethyl acrylate copolymer, and the like, polyvinyl chloride fibers, polyurethane fibers, polyester fibers, polyester copolymer fibers, polyamide fibers, and polyamide copolymer fibers. These low melting point thermoplastic fibers are used alone or in combination of two or more.

The nonwoven fabric is produced by a spunbonding method in which a thermoplastic resin as a material of the fibers is formed into a sheet shape while being discharged in a long fibrous form, a method in which a sheet or mat of a web of the fibers is needle-punched to entangle the fibers in the sheet or mat together, a thermal bond method in which the sheet or mat of the web of the fibers is heated to soften the low melting point thermoplastic fibers to bind the fibers together, a chemical bond method in which a synthetic resin binder is impregnated or mixed into the sheet or mat of the web of the fibers to bind the fibers together, a stitch bond method in which the sheet or mat of the web of the fibers is needle-punched to entangle the fibers in the sheet or mat together, and the low melting point thermoplastic fibers are heated and softened to bind the fibers together, or a stitch bonding by sewing with string, or a spun lace method in which the fibers are twined together using a high-pressure water stream, and the like.

The nonwoven fabric used for the base sheet 11 has a airflow resistance of from 0.01 to 0.1 kPa·s/m. The airflow resistance is preferably 0.015 to 0.08 kPa·s/m, and more preferably 0.015 to 0.04 kPa·s/m. When the airflow resistance of the nonwoven fabric is excessively low, the density of the base sheet 11 becomes too low, and thereby the strength and rigidity of the base sheet 11 are decreased, and the thermosetting resin forming the resin film 12 is likely to penetrate. When the airflow resistance of the nonwoven fabric is excessively high, the density of the base sheet 11 becomes high, and thereby the rigidity is increased, which lowers the flexibility, formability, and sound absorbing characteristics of the whole sound-absorbing membrane 10.

From the viewpoint of setting the airflow resistance from 0.01 to 0.1 kPa·s/m, the mass per unit area of the nonwoven fabric is preferably from 10 $g/m^2$ to 120 $g/m^2$, more preferably from 15 $g/m^2$ to 110 $g/m^2$, and still more preferably from 15 $g/m^2$ to 100 $g/m^2$. From the viewpoint of setting the airflow resistance from 0.01 to 0.1 kPa·s/m, the thickness of the nonwoven fabric is preferably from 0.1 to 2.0 mm, more preferably from 0.12 to 1.0 mm, and still more preferably from 0.14 to 0.8 mm. When the mass per unit area of the nonwoven fabric is excessively small or the thickness of the nonwoven fabric is excessively small, there is a high probability that the airflow resistance does not reach 0.01 kPa·s/m. When the mass per unit area of the nonwoven fabric is excessively large or the thickness of the nonwoven fabric is excessively large, there is a high probability that the airflow resistance exceeds 0.1 kPa·s/m.

In the nonwoven fabric used for the base sheet 11, higher fatty acids such as stearic acid and palmitic acid; higher alcohols such as palmityl alcohol and stearyl alcohol; fatty acid esters such as butyryl stearate and glycerin mono stearate; fatty acid amides; natural waxes or synthetic waxes such as carnauba wax, paraffins and paraffin oil; water repellents and oil repellents such as a fluorine resin, a silicone resin, polyvinyl alcohol, and grease; flame retardants such as a pigment, a dye, an antioxidant, an antistatic agent, a crystallization accelerator, a phosphorus compound, a nitrogen-based compound, a sulfur-based compound, a boron-based compound, a bromine-based compound, a guanidine-based compound, a phosphate-based compound, a phosphate ester-based compound, and an amino-based resin; and various agents such as expanded graphite, a flame retardant, an insect repellent, an antiseptic agent, a surfactant, a lubricant, an antioxidant, and an ultraviolet absorber may be added.

As the material of the resin film 12, a thermosetting resin is used. As the thermosetting resin, a urethane-based resin, a melamine-based resin, and a thermosetting acrylic resin are used, and a thermosetting acrylic resin that forms an ester bond during heating to be cured, a urea-based resin, a phenolic resin, an epoxy-based resin, and a thermosetting polyester resin, and the like are particularly used. There may be used synthetic resin precursors such as prepolymers, oligomers, and monomers such as a urethane-based resin prepolymer, a urea-based resin prepolymer (an initial condensate), a phenolic resin prepolymer (an initial condensate), a diallyl phthalate prepolymer, an acrylic oligomer, polyvalent isocyanate, a methacrylic ester monomer, and a diallyl phthalate monomer. From the viewpoint of easy treating, the thermosetting resin is preferably used in a form of an aqueous solution, aqueous emulsion, or aqueous dispersion, but the thermosetting resin may be used in a form of an organic solvent solution. The thermosetting resins or the synthetic resin precursors may be used in mixtures of two kinds or more.

The mass per unit area of the resin film 12 depends on the applied amount (in terms of solid content) of a coating liquid to be described later. From the viewpoint of setting the whole airflow resistance from 0.2 to 5.0 kPa·s/m in order to provide suitable sound absorbing performance while reducing the weight of the sound-absorbing membrane 10, the mass per unit area of the resin film 12 is specifically 50 g/m$^2$ or less, and preferably from 10 g/m$^2$ to 50 g/m$^2$.

A desirable example of the thermosetting resin is a phenolic resin.

There are two types of the phenolic resin. One of which is a resol type phenolic resin, which is obtained by the reaction between a phenolic compound and an excess amount of formaldehyde, using an alkali catalyst. The other of which is a novolak type phenolic resin, which is obtained by the reaction between a formaldehyde and an excess amount of phenol, using an acid catalyst. The resol type phenolic resin consists of various phenol alcohols produced by the addition of formaldehyde and phenol, and is normally provided as an aqueous solution. The novolak type phenolic resin consists of various dihydroxydiphenylmethane derivatives in which phenol is further condensed in the phenol alcohol. The novolak type phenolic resin is normally provided as powder.

The desirable phenolic resin is a phenol-alkylresorcin cocondensate. The phenol-alkylresorcin cocondensate provides an aqueous solution of the cocondensate (an initial condensate) having good stability, and is advantageous in that it can be stored for a long period at room temperature, as compared with a condensate consisting of only phenol (an initial condensate). The resin film 12 obtained by applying the aqueous solution to the base sheet 11 and bringing the aqueous solution into the semi-cured state (the B-stage) has good stability and does not lose its formability even when the sound-absorbing membrane 10 is stored for a long period. Furthermore, alkylresorcin has high reactivity with formaldehyde, catches free aldehyde to react therewith, and thereby it also has advantages such as less amount of free aldehyde in the resin.

A polyhydric phenol mixture obtained by the dry distillation of oil shale produced in Estonia is inexpensive, and contains large amounts of 5-methyl resorcin and other types of alkylresorcin that are highly reactive, and thereby the polyhydric phenol mixture is a particularly preferable polyhydric phenol raw material in the present invention.

With the phenolic resin, a catalyst or a pH adjuster may be mixed as necessary in its production. Furthermore, a curing agent such as formaldehyde or an alkylol triazone derivative may be added to the initial condensate (including the initial cocondensate) of the phenolic resin of the present invention. Furthermore, when a water-soluble phenolic resin is used, the phenolic resin may be sulfomethylated and/or sulfimethylated in order to improve the stability of the water-soluble phenolic resin.

One of the other desirable thermosetting resins is an ester bond-forming curable thermosetting acrylic resin.

The ester bond-forming curable thermosetting acrylic resin is also referred to as a pseudo thermoplastic resin, and contains (A) from 5 to 100% by mass of a polymer containing ethylenically unsaturated dicarboxylic acid in which an ethylenically unsaturated acid anhydride or a carboxylic acid group can form an acid anhydride group, and obtained by radical polymerization; (B)alkanolamine having at least two hydroxyl groups; and a phosphorus-containing reaction promoter of less than 1.5% by mass based on the sum of (A)+(B). The ester bond-forming curable thermosetting acrylic resin is a formaldehyde-free aqueous binder.

The aqueous binder is generally provided in the form of an aqueous emulsion, aqueous solution, water-soluble organic solvent solution such as isopropanol, ethanol or glycol, or solution of a mixed solvent of water and the water-soluble organic solvent, and the like. The aqueous binder is cured by the esterification reaction between an acid contained in the polymer (A) and a hydroxyl group contained in the alkanolamine (B), which changes the water solubility to water insolubility, and changes from thermoplasticity to pseudo-thermoplasticity.

The pseudo thermoplastic resin is currently marketed under Acrodur (the trade name) manufactured by BASF, and examples of the pseudo thermoplastic resin include 950L, DS3530 as an aqueous solution type, and 958D as an aqueous emulsion type.

The crosslinking of the Acrodur is initiated by the esterification reaction at a temperature of about 120° C. or more, and the Acrodur is cured at a temperature of 160° C. or more. However, the Acrodur has sufficient hardness even in a thermoplastic state before crosslinking, and is easily treated. Moreover, during thermoforming, the hardness of the Acrodur is lowered by heating, which causes the Acrodur to temporarily become thermoplastic (the pseudo thermoplastic). The Acrodur exhibits better formability, and provides higher forming accuracy. The crosslinking of the Acrodur is based on the esterification reaction, which advantageously causes only water to be formed as a by-product, and does not cause a harmful substance such as formaldehyde to be formed as a by-product.

Two or more kinds may be used as the pseudo thermoplastic resins. For example, aqueous solution type and aqueous emulsion type pseudo thermoplastic resins may be mixed, or the other thermoplastic resin aqueous emulsion and the like may be mixed.

The pseudo thermoplastic resin is described in detail in, for example, Japanese Translation of PCT International Patent Application Publication No. 2000-506940.

For the purposes of improving the dispersibility of the fillers, making it easier to treat the thermosetting resin, and improving the formability, a general thickener, dispersant, softening agent, or plasticizer may be mixed with, or one or two or more kinds of thermoplastic resins with a certain amount such that they do not inhibit the thermosetting resin may be mixed with the thermosetting resin of the resin film 12. From the viewpoint of easy treating, the thermoplastic resin is preferably used in the form of an aqueous solution, aqueous emulsion, or aqueous dispersion, but it may be used in the form of an organic solvent solution.

Examples of the thermoplastic resin include an acrylate resin, a methacrylate resin, an ionomer resin, an ethylene-ethyl acrylate (EEA) resin, an acrylonitrile-styrene-acryl rubber copolymer (ASA) resin, an acrylonitrile-styrene copolymer (AS) resin, an acrylonitrile-chlorinated polyethylene-styrene copolymer (ACS) resin, an ethylene-vinyl acetate copolymer (EVA) resin, an ethylene vinyl alcohol copolymer (EVOH) resin, a methacrylic resin (PMMA), polybutadiene (BDR), polystyrene (PS), polyethylene (PE), an acrylonitrile-butadiene-styrene-copolymer (ABS) resin, chlorinated polyethylene (CPE), polyvinyl alcohol (PVA), polyvinyl chloride (PVC), polyvinylidene chloride (PVDC), polypropylene (PP), a cellulose acetate (CA) resin, syndiotactic polystyrene (SPS), polyoxymethylene (i.e., polyacetal or POM), polyamide (PA), polyimide (PI), polyamideimide (PAI), polyetherimide (PEI), polyarylate (PAR), a thermoplastic polyurethane (TPU) elastomer, a thermoplastic elastomer (TPE), a liquid crystal polymer (LCP), polyetheretherketone (PEEK), polysulfone (PSF), polyethersulfone (PES), a fluorine resin, polytetrafluoroethylene (PTFE), polyethylene terephthalate (PET), polycarbonate (PC), polyphenylene ether (PPE), modified PPE, polyphenylene sulfide (PPS), polybutylene terephthalate (PBT), polybenzimidazole (PBI), and wholly aromatic polyester (POB).

Examples of the fillers 13 include hollow particles such as shirasu balloon, pearlite, glass balloon, foaming glass, and hollow ceramics; plastic foaming bodies or particles such as foaming polyethylene, foaming polystyrene and foaming polypropylene; inorganic fillers such as calcium carbonate, magnesium carbonate, barium sulfate, calcium sulfate, calcium sulfite, calcium phosphate, calcium hydroxide, magnesium hydroxide, aluminum hydroxide, magnesium oxide, titanium oxide, iron oxide, zinc oxide, alumina, silica, colloidal silica, mica, diatomaceous earth, dolomite, plaster, talc, clay, asbestos, mica, calcium silicate, bentonite, white carbon, carbon black, iron powder, aluminum powder, glass powder, stone powder, blast furnace slag, fly ash, cement, and zirconia powder; and organic fillers such as wood flour, walnut flour, coconut husk flour, wheat flour, and rice flour.

Among the above, the hollow particles such as shirasu balloon are hollow, and largely contribute to improvement in sound absorbing performance, which are desirable as the fillers 13.

The appearance quality of the sound-absorbing membrane 10 is improved by the texture of the fibers of the base sheet 11, and the base sheet 11 is reinforced by the resin film 12 provided on the back surface of the base sheet 11, and thereby the strength or the like of the base sheet 11 is improved. In the sound-absorbing membrane 10, the fillers 13 dispersed and contained in the resin film 12 form a gap between the fillers 13, and thereby the resin film 12 has gas permeability. Therefore, when noise passes through the base sheet 11 and the resin film 12, the sound-absorbing membrane 10 is configured to absorb the noise by a buffering sound absorbing function.

Normally, the sound-absorbing membrane 10 is used in a state where it is laminated on a surface of a porous material, and is formed into a predetermined shape together with the porous material. Therefore, in order to impart formability to the sound-absorbing membrane 10, the resin film 12 is formed of a thermosetting resin in the semi-cured state (the B-stage). The resin film 12 made of the thermosetting resin in the semi-cured state (the B-stage) does not inhibit the flexibility of the base sheet 11 made of a nonwoven fabric, and the sound-absorbing membrane 10 has flexible formability. In addition, by bringing the thermosetting resin into the semi-cured state (the B-stage), the resin film 12 has adhesiveness provided by viscosity, and also functions as an adhesive to the porous material. Furthermore, the resin film 12 has viscosity provided by bringing the thermosetting resin into the semi-cured state (the B-stage), whereby the thermosetting resin is less likely to penetrate into the nonwoven fabric of the base sheet 11, and also less likely to ooze out on a surface of the base sheet 11.

That is, when the resin film 12 is made of the thermosetting resin in the semi-cured state (the B-stage), formability and adhesiveness are imparted to the sound-absorbing membrane 10, and the penetration of the thermosetting resin into the nonwoven fabric of the base sheet 11, and the oozing-out the thermosetting resin from the nonwoven fabric of the base sheet 11 are suppressed, whereby good appearance quality is imparted.

From the viewpoint of providing suitable sound absorbing performance, in the sound-absorbing membrane 10, the whole airflow resistance of the base sheet 11 together with the resin film 12 as a whole is set from 0.2 to 5.0 kPa·s/m. The airflow resistance is preferably 0.25 to 4.5 kPa·s/m, and more preferably 0.3 to 4.0 kPa·s/m. When the airflow resistance of the sound-absorbing membrane 10 is not within the range, desired sound absorbing performance cannot be exhibited.

From the viewpoint of setting the airflow resistance of the sound-absorbing membrane 10 to be within the range, powder having an average particle diameter of 1 to 100 μm is used for the fillers 13. The average particle diameter is preferably 10 to 90 μm, and more preferably 15 to 70 μm. When the average particle diameter of the fillers 13 is excessively small, a gap is less likely to be formed between the fillers 13, whereby the airflow resistance of the sound-absorbing membrane 10 becomes large. Contrastingly, when the average particle diameter of the fillers 13 is excessively large, an excessively large gap is formed between the fillers 13, whereby the airflow resistance of the sound-absorbing membrane 10 becomes small.

From the viewpoint of setting the airflow resistance of the sound-absorbing membrane 10 to be within the range, the mixing ratio of the fillers/the thermosetting resin in the resin film 12 is preferably from 55/45 to 70/30 in a solid content ratio. When the fillers 13 is much higher in the mixing ratio than the thermosetting resin, the thermosetting resin cannot exhibit its function as a binder of the fillers 13. Contrastingly, the thermosetting resin is much higher in the mixing ratio than the fillers 13, the gap between the fillers 13 is filled with the resin, which causes a high probability that the gas permeability of the resin film 12 is lost.

Figure 2:
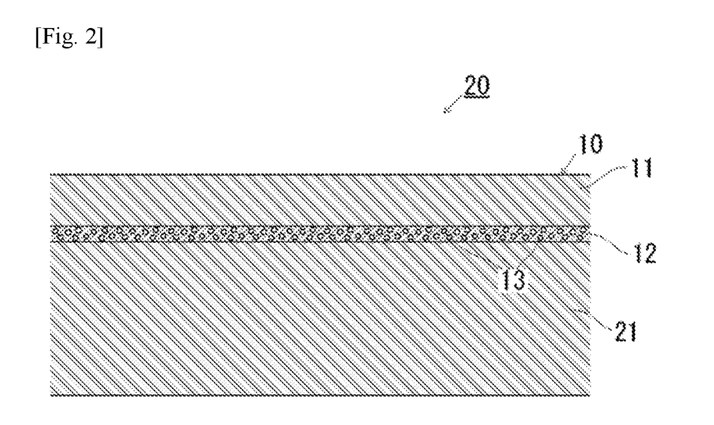
FIG. 2 is a cross-sectional view showing a sound-absorbing material of an embodiment.

As shown in FIG. 2, a sound-absorbing material 20 of the present embodiment is configured by laminating the sound-absorbing membrane 10 on a surface of a sound absorbing base sheet 21 such that the resin film 12 faces the sound absorbing base sheet 21, and forming the laminated product into a predetermined shape. The sound-absorbing material 20 is not limited to the lamination of the sound-absorbing membrane 10 not only on a surface (one surface) of the sound absorbing base sheet 21, and the sound-absorbing material 20 may be configured by laminating the sound-absorbing membrane 10 on both front and back surfaces of the sound absorbing base sheet 21.

A porous material is used for the sound absorbing base sheet 21. Examples of the porous material include nonwoven fabrics and felts made of the fibers mentioned for the base sheet 11 of the sound-absorbing membrane 10, as well as an inorganic porous material using glass wool, rock wool, asbestos fibers, carbon fibers, ceramic fibers, metal fibers, and whiskers, and the like, or breathable plastic foaming bodies such as breathable polyurethane foaming bodies, breathable polyethylene foaming bodies, breathable polypropylene foaming bodies, breathable polystyrene foaming bodies, breathable phenolic resin foaming bodies, and breathable melamine resin foaming bodies.

In principle, the basis weight and thickness of the sound absorbing base sheet 21 can be set optionally.

The sound absorbing base sheet 21 and the sound-absorbing membrane 10 are bonded to each other. For the bonding, the resin film 12 made of the thermosetting resin in the semi-cured state (the B-stage) is used as an adhesive, but if desired, adhesives such as a hot melt adhesive, an acrylic resin adhesive, an acrylic resin pressure-sensitive adhesive, a synthetic rubber adhesive, and a synthetic rubber pressure-sensitive adhesive may be used. When such an adhesive is used, it is essential to maintain the gas permeability between the sound absorbing base sheet 21 and the sound-absorbing membrane 10. For example, when a hot melt adhesive is used as the adhesive, from the viewpoint of maintaining the gas permeability between the sound absorbing base sheet 21 and the sound-absorbing membrane 10, desirably, a powdery adhesive is used, and scattered in a dot form with an applied amount of preferably from 2 g/m$^2$ to 40 g/m$^2$, and more preferably from 5 g/m$^2$ to 30 g/m$^2$.

A single substance or a mixture of two or more kinds of low melting point thermoplastic resin powders such as polyethylene resin powder having a melting point of 80 to 180° C., polyester resin powder, polyamide resin powder, and ethylene-vinyl acetate copolymer powder are used as the hot melt adhesive. The average particle diameter of the hot melt adhesive powder provided by a sieving method is preferably within the range of 80 to 500 μm. When the average particle diameter is less than 80 μm, and the hot melt adhesive powder is applied, the powder is scattered, which makes it difficult to uniformly apply the powder. Powders with fine particles gather tightly, whereby the density of the applied layer of the hot melt resin powder is formed to be increased. The applied layer is in a film form as if having no hole. The airflow resistance of the sound-absorbing material 20 tends to be excessive. When the average particle diameter exceeds 500 μm, the applied layer of the obtained hot melt resin powder has a coarse structure, which may cause a decreased adhesion force without the hot-melted adhesives being bonded to each other. The melted material of the hot melt resin powder oozes out on a surface of the sound-absorbing membrane 10, which causes deterioration in appearance quality. Furthermore, powder with large particles is hot-melted to spread, which causes a film having a film-like shape with no hole to be formed. The film with no hole may impair gas permeability, which causes deterioration in sound absorbing performance.

The hot melt adhesive may be applied onto a surface of the sound absorbing base sheet 21 or the resin film 12 of the sound-absorbing membrane 10 in a step before the sound-absorbing membrane 10 is bonded to the sound absorbing base sheet 21. Alternatively, the hot melt adhesive may be contained in the resin film 12 by previously mixing the hot melt adhesive with a liquid of a thermosetting resin in the uncured state (the A-stage) when a coating liquid to be described later is produced.

When the sound-absorbing membrane 10 is produced, fillers are previously dispersed in a liquid of a thermosetting resin in the uncured state (the A-stage) such that the mixing ratio of the fillers/the thermosetting resin is within the above range, to produce a coating liquid.

Next, the coating liquid is applied onto a base sheet 11 made of a nonwoven fabric having a airflow resistance of 0.01 to 0.1 kPa·s/m. The applying method is not particularly limited, and examples thereof include a roll coater, a knife coater, and a flow coater. In the applying, the applied amount of the coating liquid is within the range of 10 g/m$^2$ to 50 g/m$^2$ in terms of solid content. The applied amount is preferably from 10 g/m$^2$ to 45 g/m$^2$, and more preferably from 10 g/m$^2$ to 40 g/m$^2$. When the applied amount is excessively small, the coating liquid does not sufficiently spread on the whole surface of the base sheet 11, whereby the resin film 12 cannot be formed. When the applied amount is excessively large, the applied coating liquid deeply penetrates into the base sheet 11 by its own weight, whereby the resin oozes out on a surface of the sound-absorbing membrane 10 during hot press forming and the like, which causes deterioration in appearance quality.

Then, the base sheet 11 to which the coating liquid is applied is heated and dried at a predetermined temperature to bring the thermosetting resin into the semi-cured state (the B-stage), whereby the resin film 12 is formed. When the base sheet 11 is heated and dried, the predetermined temperature is appropriately set to a temperature at which the thermosetting resin is in the semi-cured state (the B-stage) according to the thermosetting resin to be used. For example, when the phenolic resin or the ester bond-forming curable thermosetting acrylic resin is used as the thermosetting resin, the temperature is set to 120° C. or more and 160° C. or less. When the temperature is less than 120° C., the thermosetting resin is not in a sufficient semi-cured state (the B-stage), and most of the thermosetting resin is in the uncured state (the A-stage), whereby the permeation of the thermosetting resin into the nonwoven fabric of the base sheet 11 and the oozing-out of the thermosetting resin from the nonwoven fabric cannot be suppressed. When the temperature exceeds 160° C., the thermosetting resin is brought into the cured state (the C-stage) without staying in the semi-cured state (the B-stage), whereby formability and adhesiveness cannot be imparted to the sound-absorbing membrane 10.

That is, the sound-absorbing membrane 10 can be easily produced by applying the coating liquid onto the base sheet 11 made of the nonwoven fabric with a predetermined applied amount, and heating and drying the coating liquid at a predetermined temperature.

When the sound-absorbing material 20 is produced, firstly, the sound-absorbing membrane 10 is laminated on a surface of the sound absorbing base sheet 21 made of a porous material such that the resin film 12 faces the sound absorbing base sheet 21, to produce a sound absorbing original fabric formed into a sheet shape and including the sound-absorbing membrane 10 and the sound absorbing base sheet 21.

Next, the sound absorbing original fabric is subjected to hot-press forming at a temperature of 180° C. or more to be formed into a predetermined shape. At this time, the resin film 12 is heated at a temperature of 180° C. or more, whereby the thermosetting resin changes its state from the semi-cured state (the B-stage) to the cured state (the C-stage) while maintaining the predetermined shape. As a result, the sound-absorbing material 20 is produced while maintaining its predetermined shape.

That is, the sound-absorbing material 20 can be easily manufactured by laminating the sound-absorbing membrane 10 on the sound absorbing base sheet 21, and by heating the laminated product during hot press forming.

EXAMPLES

Hereinafter, the present invention will be described in further detail with reference to examples further embodying the present invention, but the present invention is not limited to the examples.

Example 1

(A) Base sheet: Three types of spunbonded nonwoven fabrics made of polyester fibers and having masses per unit area (A-1) to (A-3) below were used.
(A-1) Mass per unit area: 15 g/m² (thickness: 0.12 mm, airflow resistance: 0.0158 kPa·s/m).
(A-2) Mass per unit area: 50 g/m² (thickness: 0.27 mm, airflow resistance: 0.032 kPa·s/m).
(A-3) Mass per unit area: 100 g/m² (thickness: 0.39 mm, airflow resistance: 0.10 kPa·s/m).
(B) Coating liquid: A resol type phenol·alkylresorcin initial cocondensation resin (an aqueous solution having a solid content of 45% by mass) was used as a thermosetting resin liquid, and shirasu balloon (an average particle diameter: 45 μm) as fillers was added thereto such that the mixing ratio in terms of a solid ratio was set to (B-1) to (B-2) below, and an acrylic thickener was further added thereto to adjust an aqueous solution to have a viscosity of 150 p and a solid content of 20% by mass, thereby obtaining a coating liquid.
(B-1) Mixing ratio of fillers/thermosetting resin: 55/45.
(B-2) Mixing ratio of fillers/thermosetting resin: 70/30.
(C) Sound-absorbing membrane: The (B) coating liquid was applied to the (A) base sheet by a roll coating method such that the applied amount was set to three types of (C-1) to (C-3) below in terms of solid content, and then heated and dried at a heating temperature of 120° C. or 160° C. for 3 minutes to bring the thermosetting resin into the semi-cured state (the B-stage) to form a resin film, thereby obtaining a sound-absorbing membrane. The specifications of the obtained sound-absorbing membranes are shown in Tables 1 and 2.
(C-1) Applied amount (in terms of solid content): 10 g/m².
(C-2) Applied amount (in terms of solid content): 25 g/m².
(C-3) Applied amount (in terms of solid content): 50 g/m².
(D) Sound-absorbing material: The (C) sound-absorbing membrane was pressed against non-formed glass wool (mass per unit area: 700 g/m², thickness: 20 mm) as a sound absorbing base sheet at 220° C. for 60 seconds by a hot press forming machine, to obtain a square plate-like sound-absorbing material. Specifically, the obtained sound-absorbing material had a peripheral part having a square frame shape in plan view and having a thickness of 3 mm, and a center part that is located on an inner side of the peripheral part, has a concave-convex portion, and has a thickness of from 5 to 10 mm. The appearance of the sound-absorbing material was visually evaluated in five stages below. The results are shown in Tables 1 and 2.

<Evaluation of Appearance>

○: Adhesiveness was wholly good, and a resin did not ooze out on a surface.

Δ: Adhesiveness was wholly good, but a resin oozed out on a surface.

▲: Adhesiveness was wholly good, but a resin largely oozed out on a surface.

x: A concave-convex portion had a low adhesive force, and peeling of a sound-absorbing membrane was partially observed.

xx: An adhesive force was very few, and peeling of a sound-absorbing membrane was substantially entirely observed.

TABLE 1

| Various conditions | | | | Specifications of sound-absorbing membrane | | |
|---|---|---|---|---|---|---|
| Base sheet (g/m²) | Mixing ratio (fillers/thermosetting resin) | Applied amount (g/m²) | Heating temperature (° C.) | Thickness of resin film (mm) | Airflow resistance (kPa · s/m) | Sound-absorbing material Appearance |
| (A-1) 15 | (B-1) 55/45 | (C-1) 10 | 120 | 0.06 | 0.212 | ○ |
| | | | 160 | 0.05 | 0.220 | ○ |
| | | (C-2) 25 | 120 | 0.09 | 0.470 | ○ |
| | | | 160 | 0.11 | 0.465 | ○ |
| | | (C-3) 50 | 120 | 0.28 | 3.870 | ○ |
| | | | 160 | 0.29 | 3.750 | ○ |
| (A-2) 50 | (B-1) 55/45 | (C-1) 10 | 120 | 0.05 | 0.225 | ○ |
| | | | 160 | 0.05 | 0.231 | ○ |
| | | (C-2) 25 | 120 | 0.10 | 0.690 | ○ |
| | | | 160 | 0.10 | 0.677 | ○ |
| | | (C-3) 50 | 120 | 0.29 | 4.010 | ○ |
| | | | 160 | 0.28 | 3.920 | ○ |
| (A-3) 100 | (B-1) 55/45 | (C-1) 10 | 120 | 0.06 | 0.312 | ○ |
| | | | 160 | 0.06 | 0.320 | ○ |
| | | (C-2) 25 | 120 | 0.12 | 0.873 | ○ |
| | | | 160 | 0.11 | 0.882 | ○ |
| | | (C-3) 50 | 120 | 0.28 | 4.100 | ○ |
| | | | 160 | 0.29 | 4.260 | ○ |

TABLE 2

| Base sheet (g/m²) | Mixing ratio (fillers/thermosetting resin) | Applied amount (g/m²) | Heating temperature (° C.) | Thickness of resin film (mm) | Airflow resistance (kPa · s/m) | Sound-absorbing material Appearance |
|---|---|---|---|---|---|---|
| (A-1) 15 | (B-2) 70/30 | (C-1) | 120 | 0.05 | 0.220 | ○ |
|  |  | 10 | 160 | 0.06 | 0.230 | ○ |
|  |  | (C-2) | 120 | 0.11 | 0.440 | ○ |
|  |  | 25 | 160 | 0.12 | 0.438 | ○ |
|  |  | (C-3) | 120 | 0.29 | 3.510 | ○ |
|  |  | 50 | 160 | 0.28 | 3.440 | ○ |
| (A-2) 50 | (B-2) 70/30 | (C-1) | 120 | 0.05 | 0.237 | ○ |
|  |  | 10 | 160 | 0.06 | 0.238 | ○ |
|  |  | (C-2) | 120 | 0.11 | 0.687 | ○ |
|  |  | 25 | 160 | 0.10 | 0.655 | ○ |
|  |  | (C-3) | 120 | 0.29 | 4.000 | ○ |
|  |  | 50 | 160 | 0.29 | 4.010 | ○ |
| (A-3) 100 | (B-2) 70/30 | (C-1) | 120 | 0.06 | 0.323 | ○ |
|  |  | 10 | 160 | 0.06 | 0.336 | ○ |
|  |  | (C-2) | 120 | 0.13 | 0.884 | ○ |
|  |  | 25 | 160 | 0.12 | 0.892 | ○ |
|  |  | (C-3) | 120 | 0.28 | 4.200 | ○ |
|  |  | 50 | 160 | 0.29 | 4.190 | ○ |

Example 2

(A) Base sheet: The same as the above [Example 1].

(B) Coating liquid: The same as the above [Example 1] except that an ester bond-forming curable thermosetting acrylic resin (trade name Acrodur 958D manufactured by BASF Japan, aqueous solution having a solid content of 42% by mass) was used as a thermosetting resin liquid.

(C) Sound-absorbing membrane: A sound-absorbing membrane was obtained in the same manner as in the above [Example 1]. The specifications of the obtained sound-absorbing membrane are shown in Tables 3 and 4.

(D) Sound-absorbing material: A sound-absorbing material was obtained in the same manner as in the above [Example 1]. Evaluation of the obtained sound-absorbing material is shown in Tables 3 and 4.

TABLE 3

| Base sheet (g/m²) | Mixing ratio (fillers/thermosetting resin) | Applied amount (g/m²) | Heating temperature (° C.) | Thickness of resin film (mm) | Airflow resistance (kPa · s/m) | Sound-absorbing material Appearance |
|---|---|---|---|---|---|---|
| (A-1) 15 | (B-1) 55/45 | (C-1) | 120 | 0.06 | 0.224 | ○ |
|  |  | 10 | 160 | 0.06 | 0.230 | ○ |
|  |  | (C-2) | 120 | 0.10 | 0.498 | ○ |
|  |  | 25 | 160 | 0.13 | 0.491 | ○ |
|  |  | (C-3) | 120 | 0.29 | 3.990 | ○ |
|  |  | 50 | 160 | 0.29 | 3.980 | ○ |
| (A-2) 50 | (B-1) 55/45 | (C-1) | 120 | 0.06 | 0.285 | ○ |
|  |  | 10 | 160 | 0.07 | 0.290 | ○ |
|  |  | (C-2) | 120 | 0.14 | 0.771 | ○ |
|  |  | 25 | 160 | 0.13 | 0.705 | ○ |
|  |  | (C-3) | 120 | 0.30 | 4.510 | ○ |
|  |  | 50 | 160 | 0.29 | 4.570 | ○ |
| (A-3) 100 | (B-1) 55/45 | (C-1) | 120 | 0.07 | 0.350 | ○ |
|  |  | 10 | 160 | 0.07 | 0.348 | ○ |
|  |  | (C-2) | 120 | 0.13 | 0.937 | ○ |
|  |  | 25 | 160 | 0.13 | 0.991 | ○ |
|  |  | (C-3) | 120 | 0.29 | 4.680 | ○ |
|  |  | 50 | 160 | 0.29 | 4.770 | ○ |

TABLE 4

| Various conditions | | | | Specifications of sound-absorbing membrane | | |
|---|---|---|---|---|---|---|
| Base sheet (g/m²) | Mixing ratio (fillers/thermosetting resin) | Applied amount (g/m²) | Heating temperature (° C.) | Thickness of resin film (mm) | Airflow resistance (kPa · s/m) | Sound-absorbing material Appearance |
| (A-1) 15 | (B-2) 70/30 | (C-1) 10 | 120 | 0.06 | 0.255 | ○ |
|  |  | 10 | 160 | 0.08 | 0.261 | ○ |
|  |  | (C-2) 25 | 120 | 0.14 | 0.556 | ○ |
|  |  | 25 | 160 | 0.14 | 0.575 | ○ |
|  |  | (C-3) 50 | 120 | 0.30 | 4.610 | ○ |
|  |  | 50 | 160 | 0.29 | 4.700 | ○ |
| (A-2) 50 | (B-2) 70/30 | (C-1) 10 | 120 | 0.06 | 0.285 | ○ |
|  |  | 10 | 160 | 0.08 | 0.300 | ○ |
|  |  | (C-2) 25 | 120 | 0.13 | 0.807 | ○ |
|  |  | 25 | 160 | 0.14 | 0.822 | ○ |
|  |  | (C-3) 50 | 120 | 0.30 | 4.690 | ○ |
|  |  | 50 | 160 | 0.29 | 4.710 | ○ |
| (A-3) 100 | (B-2) 70/30 | (C-1) 10 | 120 | 0.07 | 0.390 | ○ |
|  |  | 10 | 160 | 0.08 | 0.441 | ○ |
|  |  | (C-2) 25 | 120 | 0.14 | 1.030 | ○ |
|  |  | 25 | 160 | 0.14 | 1.100 | ○ |
|  |  | (C-3) 50 | 120 | 0.30 | 4.950 | ○ |
|  |  | 50 | 160 | 0.29 | 4.190 | ○ |

Comparative Example 1

(A) Base sheet: The same as the above [Example 1] except that a mass per unit area was set to two types of (A-1) and (A-3) below.

(A-1) Mass per unit area: 15 g/m² (thickness: 0.12 mm, airflow resistance: 0.0158 kPa·s/m).

(A-3) Mass per unit area: 100 g/m² (thickness: 0.39 mm, airflow resistance: 0.10 kPa·s/m).

(B) Coating liquid: The same as the above [Example 1].

(C) Sound-absorbing membrane: A sound-absorbing membrane was obtained in the same manner as in the above [Example 1] except that a resin film was brought into not the semi-cured state (the B-stage) but the uncured state (the A-stage) at a heating temperature of 100° C. (less than 120° C.), or the resin film was not stayed in the semi-cured state (the B-stage) but brought into the cured state (the C-stage) at 180° C. (more than 160° C.). The specifications of the obtained sound-absorbing membranes are shown in Tables 5 and 6.

(D) Sound-absorbing material: A sound-absorbing material was obtained in the same manner as in the above [Example 1]. The evaluation of the obtained sound-absorbing material is shown in Tables 5 and 6.

TABLE 5

| Various conditions | | | | Specifications of sound-absorbing membrane | | |
|---|---|---|---|---|---|---|
| Base sheet (g/m²) | Mixing ratio (fillers/thermosetting resin) | Applied amount (g/m²) | Heating temperature (° C.) | Thickness of resin film (mm) | Airflow resistance (kPa · s/m) | Sound-absorbing material Appearance |
| (A-1) 15 | (B-1) 55/45 | (C-1) 10 | 100 | 0.05 | 0.203 | ▲ |
|  |  | 10 | 180 | 0.05 | 0.215 | xx |
|  |  | (C-2) 25 | 100 | 0.08 | 0.460 | ▲ |
|  |  | 25 | 180 | 0.13 | 0.459 | xx |
|  |  | (C-3) 50 | 100 | 0.27 | 3.250 | Δ |
|  |  | 50 | 180 | 0.28 | 3.370 | x |
| (A-3) 100 | (B-1) 55/45 | (C-1) 10 | 100 | 0.06 | 0.332 | ▲ |
|  |  | 10 | 180 | 0.05 | 0.311 | xx |
|  |  | (C-2) 25 | 100 | 0.10 | 0.855 | ▲ |
|  |  | 25 | 180 | 0.10 | 0.829 | xx |
|  |  | (C-3) 50 | 100 | 0.27 | 4.250 | Δ |
|  |  | 50 | 180 | 0.27 | 4.340 | xx |

TABLE 6

| Various conditions | | | | Specifications of sound-absorbing membrane | | |
|---|---|---|---|---|---|---|
| Base sheet (g/m²) | Mixing ratio (fillers/thermosetting resin) | Applied amount (g/m²) | Heating temperature (° C.) | Thickness of resin film (mm) | Airflow resistance (kPa · s/m) | Sound-absorbing material Appearance |
| (A-1) 15 | (B-2) 70/30 | (C-1) | 100 | 0.06 | 0.231 | ▲ |
| | | 10 | 180 | 0.06 | 0.230 | xx |
| | | (C-2) | 100 | 0.12 | 0.457 | ▲ |
| | | 25 | 180 | 0.11 | 0.449 | xx |
| | | (C-3) | 100 | 0.30 | 3.610 | ▲ |
| | | 50 | 180 | 0.28 | 3.740 | xx |
| (A-3) 100 | (B-2) 70/30 | (C-1) | 100 | 0.05 | 0.340 | ▲ |
| | | 10 | 180 | 0.06 | 0.339 | x x |
| | | (C-2) | 100 | 0.16 | 0.888 | ▲ |
| | | 25 | 180 | 0.15 | 0.902 | xx |
| | | (C-3) | 100 | 0.29 | 4.900 | Δ |
| | | 50 | 180 | 0.29 | 4.890 | xx |

Comparative Example 2

(A) Base sheet: The same as the above [Example 1] except that a mass per unit area was set to two types of (A-1) and (A-3) below.

(A-1) Mass per unit area: 15 g/m² (thickness: 0.12 mm, airflow resistance: 0.0158 kPa·s/m).

(A-3) Mass per unit area: 100 g/m² (thickness: 0.39 mm, airflow resistance: 0.10 kPa·s/m).

(B) Coating liquid: The same as the above [Example 1].

(C) Sound-absorbing membrane: A sound-absorbing membrane was obtained in the same manner as in the above [Example 1] except that an applied amount of a coating liquid in terms of solid content was changed to two types of (C-4) and (C-5) below. Table 7 shows the specifications of the obtained sound-absorbing membrane.

(C-4) Applied amount (in terms of solid content): 8 g/m².

(C-5) Applied amount (in terms of solid content): 60 g/m².

(D) Sound-absorbing material: A sound-absorbing material was obtained in the same manner as in the above [Example 1]. The evaluation of the obtained sound-absorbing material is shown in Table 7.

TABLE 7

| Various conditions | | | | Specifications of sound-absorbing membrane | | |
|---|---|---|---|---|---|---|
| Base sheet (g/m²) | Mixing ratio (fillers/thermosetting resin) | Applied amount (g/m²) | Heating temperature (° C.) | Thickness of resin film (mm) | Airflow resistance (kPa · s/m) | Sound-absorbing material Appearance |
| (A-1) 15 | (B-2) 55/45 | (C-4) | 120 | 0.01 | 0.121 | x |
| | | 8 | 160 | 0.01 | 0.144 | xx |
| | | (C-5) | 120 | 0.41 | 6.880 | ○ |
| | | 60 | 160 | 0.45 | 6.710 | ○ |
| (A-3) 100 | (B-2) 55/45 | (C-4) | 120 | 0.01 | 0.152 | x |
| | | 8 | 160 | 0.01 | 0.153 | xx |
| | | (C-5) | 120 | 0.47 | 6.940 | ○ |
| | | 60 | 160 | 0.49 | 6.830 | ○ |
| (A-1) 15 | (B-2) 70/30 | (C-4) | 120 | 0.02 | 0.155 | x |
| | | 8 | 160 | 0.02 | 0.149 | xx |
| | | (C-5) | 120 | 0.43 | 6.600 | ○ |
| | | 60 | 160 | 0.47 | 6.810 | ○ |
| (A-3) 100 | (B-2) 70/30 | (C-4) | 120 | 0.03 | 0.128 | x |
| | | 8 | 160 | 0.03 | 0.124 | xx |
| | | (C-5) | 120 | 0.48 | 6.920 | ○ |
| | | 60 | 160 | 0.49 | 6.920 | ○ |

[Discussion 1]

In the above Examples 1 and 2, the whole airflow resistance of the whole sound-absorbing membrane was within a range of 0.2 to 5.0 kPa·s/m, and the appearance of the sound-absorbing material had no problem.

In Comparative Example 1, the thermosetting resin of the resin film was not brought into the semi-cured state (the B-stage) at a heating temperature of 100° C. or 180° C. during the production of the sound-absorbing membrane. When, in Comparative Example 1, the thermosetting resin of the resin film was brought into the uncured state (the A-stage) at a heating temperature of 100° C., formability and adhesiveness had no problem, but the resin largely oozed out on a surface with respect to the appearance of the sound-absorbing material. When the heating temperature was 180° C. and the thermosetting resin of the resin film was brought into the cured state (the C-stage), formability and adhesiveness had a problem.

Comparative Example 2 is resin films, one of which was not sufficiently formed in a state where the applied amount of the coating liquid was set to 8 g/m², and the other of which was excessively form in a state where the applied amount of the coating liquid was increased to 60 g/m². In Comparative Example 2, when the resin film was not sufficiently formed by reducing the applied amount (8 g/m²), the whole airflow resistance of the whole sound-absorbing membrane was less than 0.2 kPa·s/m, whereby adhesiveness had a problem. When the resin film was excessively formed by increasing the applied amount (60 g/m²), adhesiveness and appearance and the like had no problem. However, the airflow resistance exceeded 5.0 kPa·s/m, which caused a problem that the gas permeability of the resin film was impaired.

Example 3

(A) Base sheet: There was used a spunbonded nonwoven fabric made of polyester fibers having a mass per unit area of 20 g/m², a thickness of 0.14 mm, and a airflow resistance of 0.04 kPa·s/m.

(B) Coating liquid: A resol type sulfomethylated phenol·alkylresorcin initial cocondensation resin (an aqueous solution having a solid content 50% by mass) was used as a thermosetting resin liquid, and any of 5 types of (B-3) to (B-7) below was added as fillers thereto. Specifically, 70 parts by mass of a thermosetting resin liquid, 65 parts by mass of fillers, 6 parts by mass of a black pigment (an aqueous solution having a solid content of 20%), 2 parts by mass of a fluorine-based water repellent agent (an aqueous solution having a solid content of 20%), 5 parts by mass of an acrylic thickener (an aqueous solution having a solid content of 50%), 10 parts by mass of a flame retardant (melamine polyphosphate), and 412 parts by mass of water were mixed together to obtain a coating liquid having a solid content of 20%, a viscosity of 200 p, and a mixing ratio of the fillers/the thermoplastic resin is 65/35.

(B-3) Talc (average particle diameter: 15 μm).
(B-4) Pearlite (average particle diameter: 70 μm).
(B-5) Calcium carbonate (average particle diameter: 10 μm).
(B-6) Aluminum hydroxide (average particle diameter: 20 μm).
(B-7) Shirasu balloon (average particle diameter: 30 μm).

(C) Sound-absorbing membrane: The (B) coating liquid was applied to the (A) base sheet by a roll coating method such that the applied amount thereof was 125 g/m² (the applied amount of the thermosetting resin was 25 g/m² in terms of solid content), and thereafter heated and dried at a heating temperature of 140° C. for 2 minutes to bring the thermosetting resin into the semi-cured state (the B-stage), thereby forming a resin film, whereby a sound-absorbing membrane was obtained.

(D) Sound-absorbing material: The above (C) sound-absorbing membrane was pressed against non-formed glass wool (mass per unit area: 700 g/m², thickness: 20 mm) as a sound absorbing base sheet by a hot press forming machine at 220° C. for 60 seconds, to obtain a sound-absorbing material having a square plate shape in plan view and having a thickness of 15 mm. The appearance of the sound-absorbing materials were evaluated in the above five stages, and a sound absorptivity at a predetermined frequency was measured as sound absorbing performance. The results are shown in Table 8.

TABLE 8

| Fillers | | Specifications of sound-absorbing membrane | | Sound-absorbing material Appearance | Sound absorptivity (%) at each frequency (Hz) | | | | | |
|---|---|---|---|---|---|---|---|---|---|---|
| Type | Average particle diameter (μm) | Thickness of resin film (mm) | Airflow resistance (kPa · s/m) | | 400 Hz | 630 Hz | 1000 Hz | 1600 Hz | 3150 Hz | 6300 Hz |
| (B-3) Talc | 15 | 0.09 | 0.450 | ○ | 47 | 50 | 77 | 85 | 90 | 95 |
| (B-4) Perlite | 70 | 0.11 | 0.550 | ○ | 48 | 51 | 80 | 87 | 95 | 97 |
| (B-5) Calcium carbonate | 10 | 0.08 | 0.480 | ○ | 45 | 50 | 77 | 85 | 94 | 98 |
| (B-6) Aluminum hydroxide | 20 | 0.07 | 0.510 | ○ | 47 | 51 | 76 | 86 | 92 | 96 |
| (B-7) Shirasu balloon | 30 | 0.09 | 0.490 | ○ | 53 | 58 | 81 | 89 | 98 | 97 |

[Discussion 2]

As a result of the above Example 3, regardless of types of the fillers, wholly excellent sound absorptivities were shown, and the appearance of each sound-absorbing material had no problem. As for the fillers, the shirasu balloon has a higher sound absorptivity at low frequencies of 400 Hz and 630 Hz than those of the other fillers, and the shirasu balloon is considered to be suitable as the fillers when sound in a low frequency range is to be absorbed.

INDUSTRIAL APPLICABILITY

A sound-absorbing membrane, a sound-absorbing material, and methods of manufacture therefor of the present invention can provide suitable sound absorbing performance, suppressed deterioration in appearance quality, and easy production, which are industrially available.

REFERENCE SIGNS LIST

10: Sound-absorbing membrane
11: Base sheet
12: Resin film
13: Fillers
20: Sound-absorbing material
21: Sound absorbing base sheet

The invention claimed is:

1. A sound-absorbing membrane comprising:
a base sheet made of a nonwoven fabric having an airflow resistance of 0.015 to 0.04 kPa·s/m; and
a resin film covering one surface of the base sheet, the resin film made of a thermosetting resin in a semi-cured state,
wherein:
fillers made of powder having an average particle diameter of 1 to 100 μm are dispersed in the resin film;
the sound-absorbing membrane has a whole airflow resistance of 0.2 to 5.0 kPa·s/m; and
in the resin film, a mixing ratio of the fillers/the thermosetting resin is from 55/45 to 70/30 in a solid content ratio.

2. The sound-absorbing membrane according to claim 1, wherein the nonwoven fabric used for the base sheet has a mass per unit area of 10 g/m² to 120 g/m² and a thickness of 0.1 to 2.0 mm.

3. The sound-absorbing membrane according to claim 1, wherein the thermosetting resin used for the resin film is a resorcinol resin or an ester bond-forming curable thermosetting acrylic resin.

4. A sound-absorbing material comprising:
a sound absorbing base sheet made of a porous material; and
the sound-absorbing membrane according to claim 1 that is laminated on one surface or both surfaces of the sound absorbing base sheet such that the resin film faces the sound absorbing base sheet,
wherein the sound-absorbing material has a predetermined shape.

5. A method of manufacturing the sound-absorbing membrane according to claim 1,
the method comprising the steps of:
applying a coating liquid obtained by dispersing the fillers in a liquid of the thermosetting resin in an uncured state onto the base sheet made of the nonwoven fabric having the airflow resistance of 0.015 to 0.04 kPa·s/m such that an applied amount of the coating liquid is within a range of 10 g/m² to 50 g/m² in terms of a solid content; and
heating and drying the base sheet onto which the coating liquid is applied, at a predetermined temperature so as to bring the thermosetting resin into the semi-cured state, to form the resin film.

6. The method of manufacturing the sound-absorbing membrane according to claim 5, wherein:
the thermosetting resin is the resorcinol resin or the ester bond-forming curable thermosetting acrylic resin; and
the base sheet is heated and dried at a temperature of 120° C. or more and 160° C. or less.

7. A method of manufacturing a sound-absorbing material,
the method comprising the steps of:
laminating the sound-absorbing membrane according to claim 1 on one surface or both surfaces of a sound absorbing base sheet made of a porous material such that the resin film faces the sound absorbing base sheet, to obtain a sound absorbing original fabric formed into a sheet shape and including the sound-absorbing membrane and the sound absorbing base sheet; and
thereafter subjecting the sound absorbing original fabric to hot press forming at a temperature of 180° C. or more, to bring the thermosetting resin of the resin film into a cured state while forming the sound absorbing original fabric into a predetermined shape.

8. A sound-absorbing membrane comprising:
a base sheet made of a nonwoven fabric having a airflow resistance 0.015 to 0.04 kPa·s/m; and
a resin film covering one surface of the base sheet, the resin film made of a thermosetting resin in a semi-cured state,
wherein:
fillers made of powder having an average particle diameter of 1 to 100 μm are dispersed in the resin film; and
the sound-absorbing membrane has a whole airflow resistance of 0.2 to 5.0 kPa·s/m,
wherein the nonwoven fabric used for the base sheet has a mass per unit area of 10 g/m² to 120 g/m² and a thickness range of at least 0.1 mm to less than 2.0 mm, in the resin film, a mixing ratio of the fillers/the thermosetting resin is from 55/45 to 70/30 in a solid content ratio.

9. A sound-absorbing material comprising:
a sound absorbing base sheet made of a porous material; and
the sound-absorbing membrane according to claim 8 that is laminated on one surface or both surfaces of the sound absorbing base sheet such that the resin film faces the sound absorbing base sheet,
wherein the sound-absorbing material has a predetermined shape.

10. A method of manufacturing the sound-absorbing membrane according to claim 8,
the method comprising the steps of:
applying a coating liquid obtained by dispersing the fillers in a liquid of the thermosetting resin in an uncured state onto the base sheet made of the nonwoven fabric having the airflow resistance of 0.015 to 0.04 kPa·s/m such that an applied amount of the coating liquid is within a range of 10 g/m² to 50 g/m² in terms of a solid content; and
heating and drying the base sheet onto which the coating liquid is applied, at a predetermined temperature so as to bring the thermosetting resin into the semi-cured state, to form the resin film.

11. The method of manufacturing the sound-absorbing membrane according to claim 8, wherein:
the thermosetting resin is the resorcinol resin or the ester bond-forming curable thermosetting acrylic resin; and
the base sheet is heated and dried at a temperature of 120° C. or more and 160° C. or less.

12. A method of manufacturing a sound-absorbing material,
the method comprising the steps of:
laminating the sound-absorbing membrane according to claim 8 on one surface or both surfaces of a sound absorbing base sheet made of a porous material such that the resin film faces the sound absorbing base sheet, to obtain a sound absorbing original fabric formed into a sheet shape and including the sound-absorbing membrane and the sound absorbing base sheet; and
thereafter subjecting the sound absorbing original fabric to hot press forming at a temperature of 180° C. or more, to bring the thermosetting resin of the resin film into a cured state while forming the sound absorbing original fabric into a predetermined shape.

\* \* \* \* \*